United States Patent [19]
Hess et al.

[11] 3,881,315
[45] May 6, 1975

[54] FAN DUCT FLOW DEFLECTOR
[75] Inventors: Paul J. Hess, Cincinnati; Hans P. Mehr, Mason, both of Ohio
[73] Assignee: General Electric Company, Cincinnati, Ohio
[22] Filed: Mar. 19, 1973
[21] Appl. No.: 342,767

[52] U.S. Cl. .................. 60/226 R; 60/230; 60/271; 239/265.19
[51] Int. Cl. ............................................. F02k 3/06
[58] Field of Search ...... 60/226 R, 226 A, 230, 271, 60/233, 242, 224; 239/127.1, 265.19, 265.33, 265.37–265.43; 60/24; 181/33 HB, 33 HC, 33 HD

[56] References Cited
UNITED STATES PATENTS

| | | | |
|---|---|---|---|
| 3,044,258 | 7/1962 | Carlton et al. | 181/33 HC |
| 3,017,140 | 1/1962 | Barnard | 60/242 X |
| 3,060,679 | 10/1962 | Schmitt | 60/271 X |
| 3,068,646 | 12/1962 | Fletcher | 60/226 A |
| 3,261,164 | 7/1966 | Tumicki | 60/226 R |
| 3,368,352 | 2/1968 | Hewson | 60/226 R |
| 3,374,630 | 3/1968 | Davison et al. | 60/226 R |

*Primary Examiner*—C. J. Husar
*Assistant Examiner*—Robert E. Garrett
*Attorney, Agent, or Firm*—Derek P. Lawrence; Lee H. Sachs

[57] ABSTRACT

A turbofan engine is provided with a fan duct and core engine wherein the fan duct exhaust nozzle emits a fan flow which substantially circumscribes a core flow emitted by the core nozzle. Means are provided by this invention for turning the fan flow radially outwardly (to redirect it into a slightly outward, or perhaps less radially inward direction) in order to reduce its influence upon the core flow thereby reducing the back pressure upon the core flow. In one form, the means for turning the fan flow includes a flow deflector which comprises the downstream extremity of an axially extending cowl disposed radially between the fan duct and a portion of the core engine. To further enhance core flow efficiency, the cowl is provided with a converging-diverging internal surface proximate the downstream extremity of the core nozzle which is adapted to accelerate the core flow through the core nozzle.

10 Claims, 3 Drawing Figures

PATENTED MAY 6 1975  3,881,315

FAN DUCT FLOW DEFLECTOR

BACKGROUND OF THE INVENTION

The present invention relates to gas turbine engines and, more particularly, to means for improving efficiency from the exhaust nozzles of turbofan engines.

Turbofan engines involve the utilization of coaxial flows of gases in an attempt to maximize useable thrust produced by the engine. The typical turbofan engine incorporates coaxial core duct and fan duct effluents which flow serially or substantially contemporaneously into the atmosphere surrounding the engine. The fan duct is generally disposed to the radial exterior of the core duct and the fan flow generally encircles the core flow. Hence, the fan flow comprises the environment surrounding the core flow and into which the core flow must pass. As a result, the fan flow influences the back pressure upon the core flow.

At take-off conditions in typical turbofan engines, the gas flow exiting from a convergent core nozzle is usually subsonic. As more fully described hereafter and as clearly shown in the drawings, by incorporating a convergent-divergent nozzle of predetermined size, the core flow can be made sonic at the throat at normal cruise conditions, the gas further accelerating through the divergent portion of the nozzle. This also results in a higher flow coefficient characteristic at take-off than that achievable through a purely convergent nozzle, and one which is insensitive to a range of nozzle pressure ratios. The convergent-divergent nozzle can be so sized as to yield the same flow coefficient as the convergent core nozzle at cruise. However, the supersonic expansion is more efficient than the prior state of the art nozzles.

The convergent-divergent nozzle when properly sized for cruise, however, will not cause the core flow to exit supersonically at take-off. Though, in this mode, the flow just becomes sonic at the throat, it then expands subsonically to the exit of the nozzle. In this subsonic mode, any radially inward component of velocity of the fan gas stream will tend to suppress the core flow by creating a discharge pressure for the core stream that is above external pressure, preventing it from expanding in the manner it would have done had the two gas streams exited purely coaxially (each would expand to an area necessary to balance the static pressures in the respective streams). The inward velocity component of the fan stream, therefore, essentially causes the core flow to have a "smaller effective area" than in the purely axial flow situation, this smaller area causing a back pressuring of the core and a suppressed nozzle flow coefficient.

Operation of turbofan engines has indicated that suppression of the core flow by the fan flow (that is, the introduction of large back pressures by the fan flow upon the core flow) may lead to inefficient core exit flow characteristics as well as raised core temperatures and undesirable shift in the relationship of the rotational speeds of the low pressure and high pressure rotors of the engine. None of these phenomena is desirable. In addition, it has been found that the suppression is particularly disadvantageous at take-off power wherein the engine is operated near its maximum achievable power output.

The present invention provides means for substantially lessening suppression of the core flow by the fan flow as well as for substantially improving nozzle efficiency.

BRIEF SUMMARY OF THE INVENTION

It is a primary object, therefore, of the present invention to provide means for reducing the adverse effects of fan flow upon the back pressure of the core flow emitted from the core nozzle and, contemporaneously, to improve nozzle efficiency at cruise power settings of a turbofan engine.

In order to accomplish this as well as other objects which will become apparent from the detailed description which follows, the present invention, in one form thereof, provides a turbofan engine having coaxial core and fan nozzles with a cowl extending axially between and radially separating the fan duct from the core engine. The cowl includes a flow deflector at its downstream extremity, the flow deflector formed by a portion of the cowl's outer surface curved radially outwardly in the downstream direction. The flow deflector acts to turn the fan flow radially outwardly in direction proximate the core nozzle in order to reduce the suppression of the subsonic core flow mentioned above in one operating mode. (By turning the flow "radially outwardly" as used throughout this specification, it is meant that radially inward components of velocity of the affected portion of fan flow are to be reduced. Thus, the affected portion of the fan flow leaving the flow deflector may actually move in a radially outward direction, or the flow may yet include radially inward velocity vectors, or in a third alternative situation, the affected portion of the fan flow could move substantially axially as it leaves the flow deflector. In any of these cases, the flow is turned radially outwardly although in certain of them, there may remain inward velocity components — these having been reduced.)

In addition, the cowl includes a radially inner surface which comprises a converging-diverging nozzle (the inner surface being curved radially inwardly and then radially outwardly proximate the core nozzle) which functions to accelerate supersonic core flow through the core nozzle and further enhances nozzle efficiency in this distinct operating mode.

As previously mentioned, the convergent-divergent passage essentially maintains the flow coefficient characteristic of a convergent core nozzle in the cruise (supersonic) mode. However, it increases the nozzle flow coefficient at take-off. By eliminating the radially inward velocity component of the fan flow (i.e., by turning the fan flow radially outwardly), the core flow stream is permitted to expand at a more rapid rate and occupy a larger effective area, thereby further increasing the nozzle flow coefficient at subsonic flow conditions. Thus, with the converging-diverging nozzle and the flow deflector more fully described herein, the present invention provides increased performance in both the cruise mode through more efficient supersonic expansion and in the take-off (subsonic) mode through increased nozzle flow coefficient.

BRIEF DESCRIPTION OF THE DRAWING

The present invention will be better understood with reference to the appended description taken with the drawing wherein.

DETAILED DESCRIPTION OF A PREFERRED EMBODIMENT

Figure 1:
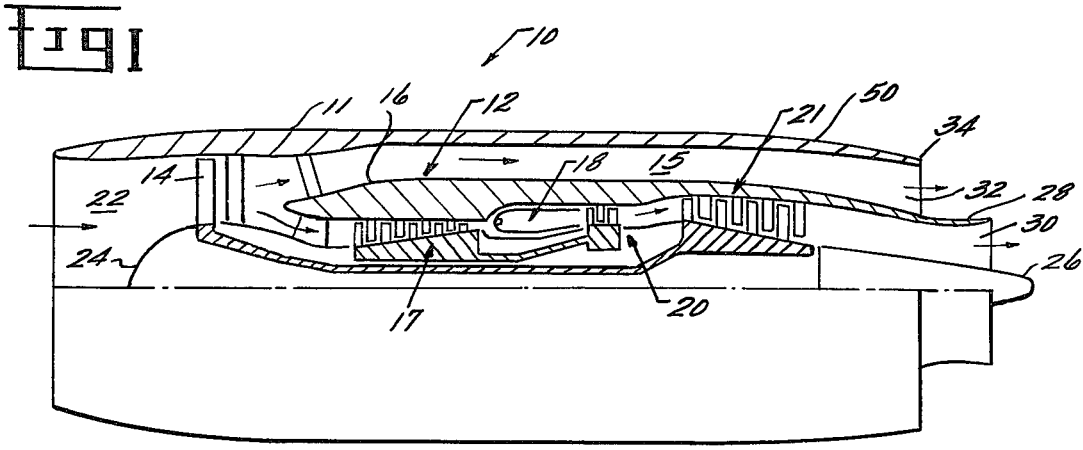
FIG. 1 depicts a simplified cross-sectional view of a typical turbofan engine incorporating the present invention.

In FIG. 1, the simplified gas turbine engine designated generally 10 includes an outer nacelle 11 which circumscribes the entire engine for a portion of its axial length. The engine comprises generally a core engine designated 12 and a fan and fan duct surrounding portions thereof designated 14 and 15, respectively. An inner cowl 16 surrounds the core engine 12 and extends axially to separate the core engine from the fan duct 15 between which it is radially disposed. The core engine generally comprises a compressor 17, a combustor 18, a high pressure turbine 20 and low pressure turbine 21. A single annular inlet 22 is defined upstream of fan 14 between the outer nacelle 11 and a bullet nose 24.

A pair of substantially coaxial exhaust nozzles is formed near the downstream end of the engine through which the operating fluids pass to provide motive thrust. Between a centerbody or tail cone 26 and a downstream portion 28 of cowl 16 is defined a core nozzle 30 through which fluid issues from the core engine. To the radial exterior of the core nozzle is disposed a fan nozzle 32 which is defined between a second portion of cowl 16 and a downstream portion 34 of nacelle 11.

This engine operates in a fashion similar to typical engines of its variety. Atmospheric air enters inlet 22 from the left of FIG. 1 to be compressed by fan 14. A portion of the flow is directed to the radial interior of cowl 16 and into the core engine to be further compressed by a compressor 17, mixed with fuel and burned within combustor 18 from which it is discharged into contact with turbines 20 and 21. A portion of the kinetic energy of the gas exiting the combustor 18 is removed by turbine 20 for the purpose of driving compressor 17; and, a further portion of this energy is removed by turbine 21 for the purpose of driving fan 14 (and sometimes a portion of the compressor). The remaining core flow exits through core nozzle 30 to provide a thrust to the left in the figure.

Contemporaneously, a second portion of the air compressed by the fan 14 is directed to the radial exterior of cowl 16 and through fan duct 15. This fan flow exits the fan duct 15 by way of the fan nozzle 32 and passes along the exterior of cowl 16 and into confluence with the core flow downstream of nozzle 30. This adds further thrust toward the left in FIG. 1.

Figure 2:
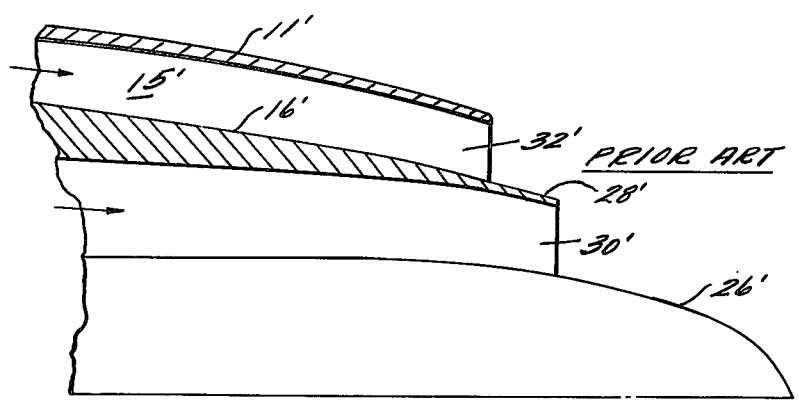
FIG. 2 depicts an enlarged portion of a turbofan engine similar to FIG. 1 but illustrating a nozzle arrangement of the prior art.

As mentioned hereinabove, problems have arisen due to effects of the fan flow upon the core flow near the core nozzle. FIG. 2 illustrates a prior art nozzle configuration and will be used to exemplify this problem. Referring to FIG. 2, it can be appreciated that at least a portion of the fan flow exiting fan duct 15' through fan nozzle 32' will be imparted with a radially inward component of velocity and will maintain this velocity as the flow passes downstream of the nozzle. In this fashion, fan flow is directed into the path of the core flow exiting core nozzle 30', the fan flow having at this point a converging or radially inwardly directed component of velocity which results in an encroachment of the fan flow upon the flow area of the core flow downstream of the nozzle 30'. This encroachment results in suppression of the core flow by the fan flow and an attendant rise in the back pressure upon the subsonic core flow. As stated, this in turn results in an increase in the core operating temperatures and a decrease in core exit nozzle efficiency. These adverse effects can substantially reduce overall engine efficiency and useful life and, therefore, are desirably eliminated.

The present invention accomplishes substantial elimination of these phenomena by providing means disposed between the core nozzle and the fan nozzle for turning the fan flow radially outwardly (so that the fan flow is redirected into a less inward or slightly radially outward direction), to reduce back pressure on the subsonic core flow thereby increasing the nozzle flow coefficient.

Figure 3:
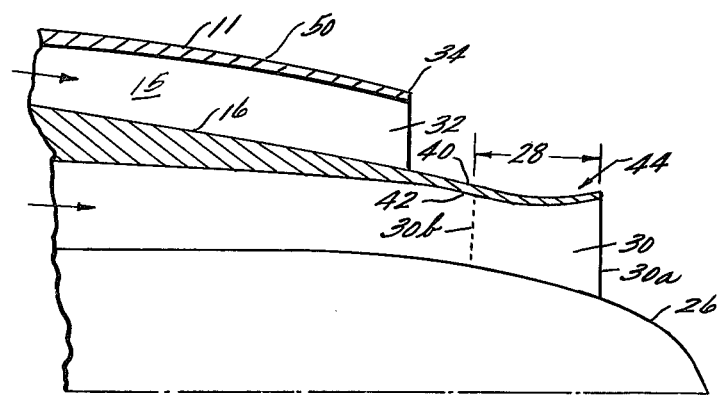
FIG. 3 depicts an enlarged portion of a turbofan engine similar to that in FIG. 2, but illustrating the application of the present invention.

More particularly, with reference to FIG. 3, an enlarged view of that portion of the engine of FIG. 1 which is affected by the application of the present invention is depicted. This Figure illustrates the cowl 16 which partially circumscribes the core engine as having a portion near the downstream extremity 30a thereof labeled generally 28. The cowl has a radially outer surface 40 and a radially inner surface 42. The inner cowl surface 42 proximate the rear extremity of cowl portion 28 partially defines core nozzle 30 (in cooperation with centerbody 26).

According to a primary object of the present invention, the radially outer surface 40 of the cowl curves radially outwardly in the downstream direction, as illustrated. Furthermore, the radially inner cowl surface 42 curves radially inwardly upstream of the downstream extremity of the core nozzle 30 and subsequently curves radially outwardly proximate the downstream extremity of the core nozzle. This latter combination of curves serves to define a converging-diverging nozzle configuration for the core nozzle.

As in the prior art, cowl portion 28 extends axially between the fan nozzle 32 and the core nozzle 30. Unlike the prior art, however, the outward curve of the radially outward cowl surface 40 proximate the downstream extremity thereof forms a flow deflector 44 which serves as the turning means to turn the fan flow radially outwardly prior to its confluence with the core flow. The amount of turning depends upon the amount of radially outward curvature of the surface 40. In the embodiment depicted in FIG. 3, the surface 40 is curved so that its downstream extremity is substantially axial (that is, parallel to the axial centerline of the engine). Thus, this flow deflector 44 will direct the fan flow substantially axially aft of the core nozzle 30.

The extent to which the fan flow is turned may be desirably more or less than that depicted in this embodiment in other circumstances. For example, turning the flow even farther radially outwardly would result in the fan flow creating a low pressure area behind core nozzle 30 which could be useful in further expanding the core flow after its exit from nozzle 30. Such adaptations of the present invention will be readily made by those skilled in the art.

Another function of the core nozzle 30 in this present configuration is to cause the core flow to accelerate to essentially sonic velocity at the throat at take-off and then decelerate subsonically through the nozzle thereby further increasing the flow coefficient thereof.

In the cruise mode, supersonic expansion aids nozzle efficiency. In the embodiment depicted, this acceleration in the cruise mode is accomplished by a low area ratio converging-diverging nozzle configuration (that is, the ratio of the flow area at the plane of the downstream extremity 30a of the core nozzle to the flow area of the "throat" 30b, the smallest flow area in the nozzle). The particular area ratio is dependent upon optimization in the circumstances of a given application of this invention. The depicted embodiment associates the converging-diverging nozzle with the aforementioned means for turning the fan flow in the subsonic core flow condition.

In operation, the turbofan engine incorporating the present invention ingests and compresses air, mixes the air with the fuel and combusts the mixture as described hereinabove. The core flow (comprising the products of combustion of the fuel and air mixture from combustor 18) exits the core engine by way of core nozzle 30. Progressing through the core nozzle, the core flow is accelerated by the combined curvatures of the converging-diverging nozzle described. Hence, the core flow is accelerated through the core nozzle and expelled at a high rate of speed downstream of core nozzle 30 and into confluence with the axially flowing fan flow.

In summary, incorporation of the subject flow deflector in cooperation with a converging-diverging core nozzle enhances the flow coefficient characteristic at take-off conditions while maintaining nozzle performance in the supersonic cruise mode. As a result, the overall efficiency of the engine is enhanced, and particularly at high power take-off settings. The latter is true for the reason that tests have indicated that, for this type engine, it is particularly advantageous to have a larger core nozzle effective flow area at high power than at cruise power settings. Selective sizing of the subject nozzle can cause a reduction in back pressure such as to create a situation wherein this relationship is established.

The present invention has thus been described with reference to a preferred embodiment. It is to be noted, however, that the invention extends conceptually substantially beyond this embodiment and that those skilled in the art will make substantial variations of the structure presented herein without departing from the scope of this invention. For example, the outer engine nacelle 11 defining the outer boundary of the fan duct need not terminate near the core nozzle. It could terminate far upstream thereof with the overall effects remaining the same. The invention is equally beneficial if the fan nozzle and core nozzle are substantially coplanar. Other variations will occur to those skilled in the art.

What is claimed as new and desired to be secured by Letters Patent of the United States is:

1. In a gas turbine engine of the turbofan variety including a core engine having a core exhaust nozzle and a fan duct having a fan exhaust nozzle disposed to the radial exterior of the core nozzle, and wherein the fan flow from the fan nozzle substantially encircles the core flow from the core nozzle, the improvement comprising:

means disposed between the core nozzle and the fan nozzle for turning the fan flow radially outwardly at the discharge plane of the core nozzle to reduce back pressure on the core flow.

2. The improvement of claim 1 wherein the means for turning further includes means for accelerating the core flow through said core nozzle.

3. The improvement of claim 1 further including a cowl partially circumscribing the core engine, and wherein said means for turning includes a flow deflector comprising a portion of said cowl and having a radially outward curve in the downstream direction.

4. The improvement of claim 3 wherein said flow deflector comprises an axially downstream portion of said cowl.

5. The improvement of claim 3 wherein said flow deflector comprises a portion of the radially outward surface of said cowl, and wherein the cowl further includes a radially inner surface which partially defines said core nozzle, said inner surface including a radially outward curve in the downstream direction.

6. A turbofan engine comprising:
a core engine having a core exhaust nozzle for emitting a core flow;
a fan duct having a fan exhaust nozzle for emitting a fan flow, the fan flow substantially encircling the core flow; and
a flow deflector disposed radially between the core nozzle and the fan duct, the flow deflector having a radially outer surface and wherein the radially outer surface curves radially outwardly in the downstream direction to turn the fan flow outwardly at the discharge plane of the core nozzle and reduce back pressure on the core flow.

7. The engine of claim 6 further including an axially extending cowl partially circumscribing the core engine wherein the flow deflector comprises a portion of said cowl.

8. The engine of claim 7 wherein the cowl has a radially inner surface, the inner surface being curved radially inwardly upstream of said core nozzle and further being curved radially outwardly proximate the downstream extremity of said core nozzle.

9. The engine of claim 8 wherein said fan nozzle is disposed upstream of said core nozzle and said cowl extends axially between said nozzles, said deflector comprising a portion of the cowl proximate the downstream extremity of said cowl.

10. The gas turbine engine of claim 2 wherein said means for accelerating the core flow comprises a converging-diverging core exhaust nozzle.

* * * * *